US009661007B2

(12) United States Patent
Gasparakis et al.

(10) Patent No.: US 9,661,007 B2
(45) Date of Patent: May 23, 2017

(54) NETWORK INTERFACE DEVICES WITH REMOTE STORAGE CONTROL

(71) Applicant: Intel Corporation, Santa Clara, CA (US)

(72) Inventors: Iosif Gasparakis, Tigard, OR (US); Scott P. Dubal, Beaverton, OR (US); Patrick Connor, Beaverton, OR (US); Kapil Sood, Beaverton, OR (US); Eliezer Tamir, Bait Shemesh (IL)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 14/661,311

(22) Filed: Mar. 18, 2015

(65) Prior Publication Data
US 2016/0277425 A1    Sep. 22, 2016

(51) Int. Cl.
| | |
|---|---|
| *H04L 29/06* | (2006.01) |
| *G06F 21/60* | (2013.01) |
| *G06F 21/85* | (2013.01) |
| *H04L 9/32* | (2006.01) |

(52) U.S. Cl.
CPC ......... *H04L 63/1416* (2013.01); *G06F 21/60* (2013.01); *G06F 21/85* (2013.01); *H04L 9/32* (2013.01); *G06F 2213/3808* (2013.01); *H04L 63/0428* (2013.01)

(58) Field of Classification Search
CPC .................................................. H04L 63/1416
See application file for complete search history.

(56) References Cited

U.S. PATENT DOCUMENTS

| | | | | |
|---|---|---|---|---|
| 2007/0124474 | A1* | 5/2007 | Margulis | G06F 3/14 709/226 |
| 2007/0150947 | A1* | 6/2007 | Vijayakumar | H04L 41/0893 726/17 |
| 2009/0027555 | A1* | 1/2009 | Hanko | H04N 5/4401 348/569 |
| 2009/0158048 | A1* | 6/2009 | Kim | H04L 9/321 713/184 |
| 2011/0022812 | A1* | 1/2011 | van der Linden | G06F 9/5077 711/163 |

(Continued)

FOREIGN PATENT DOCUMENTS

| | | |
|---|---|---|
| EP | 1 895 738 A2 | 3/2008 |
| WO | WO 02/27519 A1 | 4/2002 |

OTHER PUBLICATIONS

Extended European Search Report mailed Jun. 21, 2016 for European Application No. 16153672.7, 7 pages.

*Primary Examiner* — Amir Mehrmanesh
*Assistant Examiner* — Ali Shayanfar
(74) *Attorney, Agent, or Firm* — Schwabe, Williamson & Wyatt, P.C.

(57) ABSTRACT

Network interface devices with remote storage control. In some embodiments, a network interface device may include receiver circuitry and remote storage device control circuitry. The remote storage device control circuitry may be coupled to the receiver circuitry and may share a physical support with the receiver circuitry. The remote storage device control circuitry may be configured to control writing of data from the receiver circuitry to a remote storage device that does not share a physical support with the remote storage device control circuitry.

25 Claims, 5 Drawing Sheets

(56) References Cited

U.S. PATENT DOCUMENTS

| | | | |
|---|---|---|---|
| 2013/0185586 A1* | 7/2013 | Vachharajani | H04L 45/44 714/2 |
| 2013/0227301 A1* | 8/2013 | Sarcone | G06F 21/85 713/189 |
| 2014/0289549 A1* | 9/2014 | Bailey | G06F 1/3296 713/324 |
| 2014/0298045 A1* | 10/2014 | Sieber | G06F 1/263 713/300 |
| 2015/0089221 A1* | 3/2015 | Taylor | H04W 12/08 713/168 |
| 2015/0106660 A1* | 4/2015 | Chumbalkar | G06F 11/0727 714/42 |
| 2015/0312087 A1* | 10/2015 | Terwilliger | H04L 41/5074 455/41.1 |
| 2016/0227301 A1* | 8/2016 | Goodwill | H04Q 11/0005 |

* cited by examiner

NETWORK INTERFACE DEVICES WITH REMOTE STORAGE CONTROL

TECHNICAL FIELD

The present disclosure relates generally to the field of computing networks, and more particularly, to network interface devices.

BACKGROUND

Cloud-based computing systems are growing in popularity, but performance may be outpacing the security of cloud-based operations. Conventional approaches require users and providers to choose between raw performance and security features.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
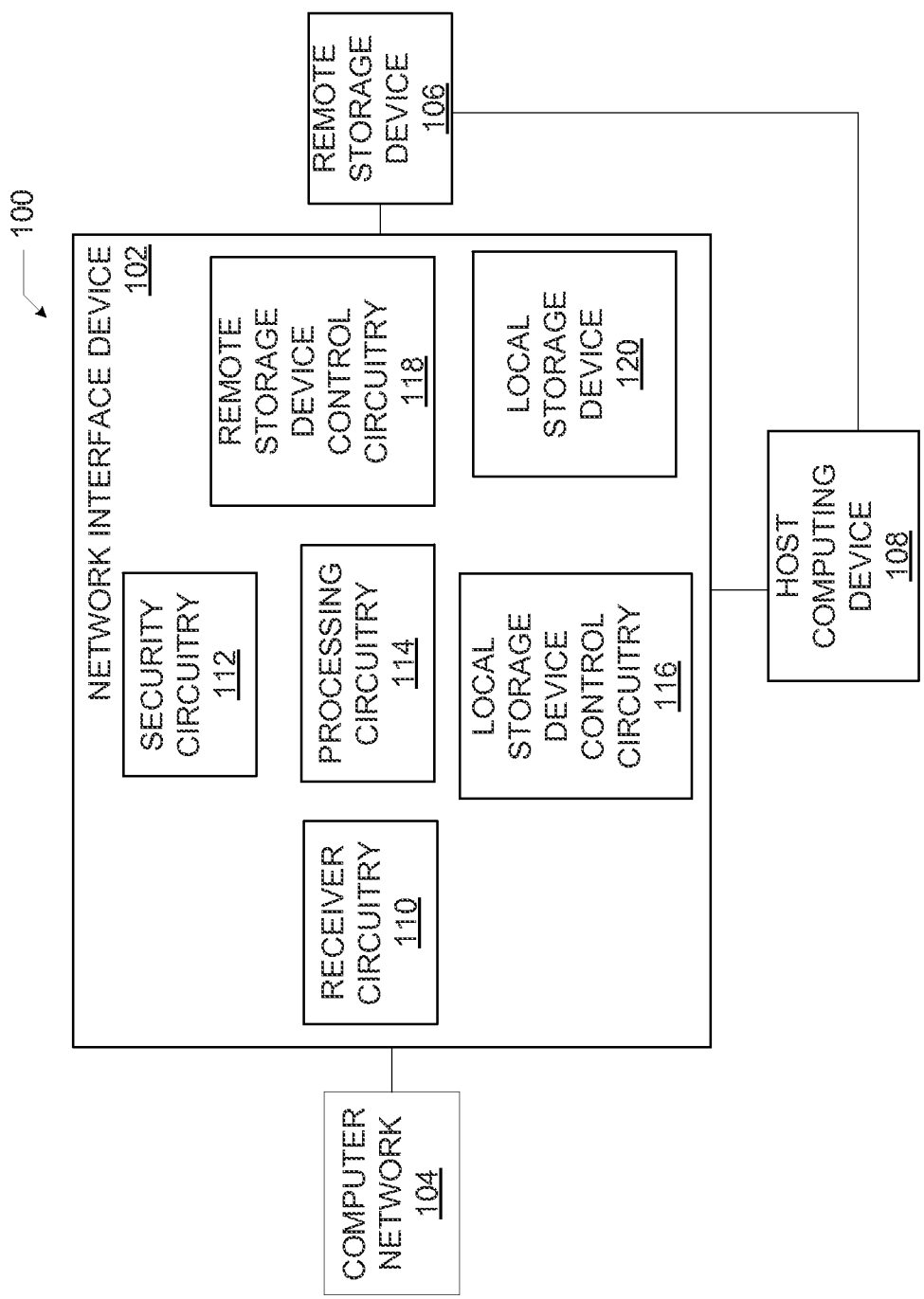
FIG. 1 is a block diagram of an illustrative remote storage system, in accordance with various embodiments.

Disclosed herein are network interface devices with remote storage control, as well as related systems and methods. For example, in some embodiments, a network interface device may include receiver circuitry and remote storage device control circuitry. The remote storage device control circuitry may be coupled to the receiver circuitry and may share a physical support with the receiver circuitry. The remote storage device control circuitry may be configured to control writing of data from the receiver circuitry to a remote storage device that does not share a physical support with the remote storage device control circuitry.

Various ones of the embodiments disclosed herein may provide a network interface controller (NIC) with an embedded storage device controller (e.g., an embedded hard drive controller). Such embodiments may be particularly usefully applied in network-based big data processing applications, such as large-scale distributed computing (e.g., using the Hadoop library), computing fabrics, server applications (e.g., Squid-based caching and forwarding web proxy applications, Transmission Control Protocol (TCP) termination, or other Internet services). Such embodiments may also be useful in cloud server settings, where a host computing device manages access to storage and processing resources for multiple tenant computing devices (e.g., to instantiate virtual machines on behalf of the tenants).

Conventional techniques for accessing data from a hard drive in a host over a network may not adequately secure the data against malicious activity. In particular, in cloud storage systems, tenants may not trust the storage host, nor may they trust other tenants. In turn, the storage host may not trust the tenants. A tenant's data is at risk of malicious activity by the storage host when data is being written to, erased, and/or read from storage by the storage host (e.g., when non-volatile memory previously used by the tenant is reallocated to another tenant), and at risk from other tenants sharing the storage even when the data is at rest.

Various embodiments disclosed herein may provide a network interface device that includes network interface controller functionality with a memory device (e.g., a solid state drive) and a processing device (e.g., a Central Processing Unit (CPU)) on a common die or other physical support (e.g., package, circuit board). In particular, by embedding a storage device controller (e.g., a hard disk controller) into a network adapter to form an integrated network interface device, the integrated network interface device can run an encrypted network file system. This encrypted network file system may be independent of the operating system of a host device, and thus the host device may manage each tenant's storage without being able to interpret the stored data. In such a scenario, the tenant and the host need not trust each other, as long as each trusts the integrity of the network interface device.

Various embodiments disclosed herein may also improve the serving of data from remote storage devices to a computer network. In particular, by removing the host computing device from the dataflow pathway when data is served, the host processors may undergo less thrashing (excessive paging or context switching) and experience reduced utilization, increasing the availability of the host processors for other computing tasks. Additionally, performing data processing on a network interface device itself may reduce latency and eliminate the need for data copying to the host central processing unit (CPU) and back.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). Furthermore, the terms "comprising," "including," "having," and the like, as used with respect to embodiments of the present disclosure, are synonymous. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, a signal may be "received" by a component if it is generated externally or internally to that component, and acknowledged and/or processed by that component.

As used herein, a first device may be referred to as "remote" from a second device if the first and second devices do not share a physical support. A first device may referred to as "local" to a second device if the first and second devices share a physical support. A number of examples of physical supports are described herein.

FIG. 1 is a block diagram of an illustrative remote storage system 100, in accordance with various embodiments. The remote storage system 100 may include a network interface device 102. The network interface device 102 may be coupled to a computer network 104, and may receive data from and/or transfer data to computing devices (not shown) included in the computer network 104. The communication of data between the computer network 104 and the network interface device 102 may be performed in accordance with conventional techniques, and is not discussed in further detail. In particular, the network interface device 102 may receive data from and/or transmit data to the computer network 104 in accordance with any conventional techniques implemented by a network interface card. The network interface device 102 may also perform other functions typically performed by a network interface card, along with the teachings disclosed herein. For example, in some embodiments, the network interface device 102 may implement the features of a system-on-NIC (SoNIC). In some embodiments, the network interface device 102 may be used with software-defined network (SDN) applications.

The network interface device 102 may be coupled to a remote storage device 106, and may store data on and/or retrieve data from the remote storage device 106. The remote storage device 106 may not share a physical support with the network interface device 102. For example, the remote storage device 106 may be included in a housing different from a housing of the network interface device 102. In another example, the remote storage device 106 may include one or more circuit boards that are different than one or more circuit boards of the network interface device 102. In another example, the remote storage device 106 may be located in a different room or building than the network interface device 102. The remote storage device 106 may include, for example, a disk drive (e.g., a hard disk drive) and/or a solid state drive. For example, the remote storage device 106 may be a redundant array of independent disks (RAID).

The network interface device 102 may control the writing of data from the computer network 104 to the remote storage device 106. For example, in some embodiments, the network interface device 102 may be configured to receive data from the computer network 104, perform one or more security operations on the data to generate processed data, and cause the processed data to be written to the remote storage device 106 using a file system on the network interface device 102. In some embodiments, the network interface device 102 may be configured to receive data from a tenant computing device included in the computer network 104, generate storage control signals for storage of the data based on a file system on the network interface device 102, and provide the storage control signals for delivery to the remote storage device 106 (e.g., over a bus). Various embodiments are discussed in further detail below.

The network interface device 102 may be coupled to a host computing device 108 (e.g., via a bus, such as a Peripheral Component Interconnect Express (PCIe) bus). In some embodiments, the network interface device 102 (by virtue of its ability to control the remote storage device 106) may appear to the host computing device 108 to be a local storage device. In some embodiments, the network interface device 102 may provide a file system for the remote storage device 106, and that file system may be encrypted against the host computing device 108 so that the host computing device 108 cannot properly read the data stored in the remote storage device 106.

In some embodiments, the network interface device 102 may directly implement an encrypted network file system for the remote storage device 106, rather than having the file system implemented within an operating system of the host computing device 108. As noted above, this architecture may resolve issues of trust between a tenant computing device and the host computing device 108, as well as between different tenant computing devices (e.g., during read/write/erase operations performed on shared non-volatile memory resources).

In some embodiments, the host computing device 108 may be coupled to the remote storage device 106. In some such embodiments, when the data stored on the remote storage device 106 by the network interface device 102 is encrypted against the host computing device 108, the host computing device 108 may not be able to interpret the data. However, the host computing device 108 may be able to perform maintenance tasks on the data, such as backing up the data to another storage device or determining how much storage is occupied. In some embodiments, the host computing device 108 may not be directly coupled to the remote storage device 106, and instead, the host computing device 108 may interact with the remote storage device 106 solely through the network interface device 102.

Turning to the components of the network interface device 102, the network interface device 102 may include receiver circuitry 110 and remote storage device control circuitry 118. The receiver circuitry 110 may be configured to receive data from one or more computing devices of the computer network 104. The remote storage device control circuitry 118 may be coupled to the receiver circuitry 110. In some embodiments, the remote storage device control circuitry 118 may share a physical support with the receiver circuitry 110. For example, the receiver circuitry 110 and the remote storage device control circuitry 118 may both be included in a common housing. In another example, the receiver circuitry 110 and the remote storage device control circuitry 118 may share a common circuit board. In another example, the receiver circuitry 110 and the remote storage device control circuitry 118 may share a common rack in a rack-mounted server system. In another example, the receiver circuitry 110 and the remote storage device control circuitry 118 may be included in a common network interface card (e.g., an add-in card), a system-on-chip (SoC), or chipset. In another example, the receiver circuitry 110 and the remote storage device controller circuitry 118 may be included in a common network switch. In another example, the receiver circuitry 110 and the remote storage device control circuitry 118 may share a common die or package.

The remote storage device control circuitry 118 may control the writing of data from the receiver circuitry 110 to the remote storage device 106. In some embodiments, the remote storage device control circuitry 118 may be coupled to the remote storage device 106 via a PCIe bus. In some embodiments, the remote storage device control circuitry 118 may provide a file system for the remote storage device 106, and thus may cause the writing of data to and the reading of data from the remote storage device 106 in accordance with the file system. As noted above, in some embodiments, such a file system may be encrypted. For example, the file system may be encrypted using an encryption key provided to the network interface device 102 from a tenant computing device of the computer network 104 via a secure channel (e.g., via a secure shell (SSH) connection to trusted hardware in the network interface device 102, such as a board management controller, discussed below). In some embodiments, the remote storage device control circuitry 118 may have an end point with a PCIe connector that is connected to a PCIe bus of the host computing device 108, and may also have a data connector for the remote storage device 106. The data connector may be a serial advanced technology attachment (SATA), small computer system interface (SCSI), Thunderbolt, or other connector, for example. In such an embodiment, the remote storage device 106 may be visible to both the host computing device 108 and the processing circuitry 114.

The network interface device 102 may include security circuitry 112. The security circuitry 112 may be coupled to the receiver circuitry 110 and to the remote storage device control circuitry 118, and may be configured to perform one or more security operations on data from the receiver circuitry 110. For example, in some embodiments, the security circuitry 112 may perform deep packet inspection on at least some of the data received by the receiver circuitry 110. As used herein, "deep packet inspection" may refer to a screening process in which the data portions of incoming network packets are examined. In some embodiments, the security circuitry 112 may encrypt at least some of the data received by the receiver circuitry 110. For example, the security circuitry 112 may perform the encryption for securing a file system for the remote storage device 106 (e.g., against the host computing device 108). In some embodiments, the security circuitry 112 may implement a firewall against data received at the receiver circuitry 110. In some embodiments, the security circuitry 112 may implement anti-virus or malicious activity detection operations on the data received by the receiver circuitry 110. By performing security operations on the network interface device 102, the activities of a tenant computing device can be monitored regardless of the security settings of a virtual machine being hosted for that tenant in the remote storage system 100. In some embodiments, the security circuitry 112 may perform any suitable security operations typically included in network security monitoring (e.g., data collection and pattern recognition to identify malicious activity).

The security circuitry 112 may share a physical support with the receiver circuitry 110 (e.g., in accordance with any of the examples discussed above). In some embodiments, the security circuitry 112 may include a board management controller (e.g., a Management Engine, or a Converged Security and Management Engine), and one or more of the security operations may be performed by the board management controller. A board management controller may include one or more dedicated processors and memory devices configured to perform platform management operations. In some embodiments, the board management controller may be configured to establish a trusted, encrypted channel with a remote computing device operated by the tenant (e.g., a tenant computing device included in the computer network 104) to allow the tenant computing device to configure cryptographic keys and other security features in the network interface device 102 without the cryptographic keys or other sensitive information being present in the host computing device 108.

The network interface device 102 may include local storage device control circuitry 116 and a local storage device 120. The local storage device 120 may share a physical support with the receiver circuitry 110 (e.g., in accordance with any of the examples discussed above) and may be coupled to the local storage device control circuitry 116. The local storage device control circuitry 116 may be coupled to the receiver circuitry 110, and may also share a physical support with the receiver circuitry 110. The local storage device control circuitry 116 may be configured to control the writing of data to and the reading of data from the local storage device 120. The local storage device 120 may be, for example, non-volatile memory.

The network interface device 102 may include processing circuitry 114. The processing circuitry 114 may include one or more processing devices and associated memory, and may be coupled to the receiver circuitry 110. In some embodiments, the processing circuitry 114 may share a physical support with the receiver circuitry 110 (e.g., in accordance with any of the examples discussed above). In some embodiments, the remote storage device control circuitry 118 may have a PCIe end point to the processing circuitry 114 (e.g., an embedded CPU). In embodiments in which the remote storage device control circuitry 118 has an end point with a PCIe connector that is connected to a PCIe bus of the host computing device 108, and also has a data connector for the remote storage device 106, the remote storage device 106 may be visible to both the host computing device 108 and the processing circuitry 114. The processing circuitry 114 may be configured to direct storage of data received by the receiver circuitry 110 to the local storage device 120, the remote storage device 106, or both. In some embodiments, the processing circuitry 114 may provide instructions for various operations to be performed on the data received by the receiver circuitry 110. For example, the processing circuitry 114 may direct the security circuitry 112 to compress the data to be stored in the remote storage device 106 or in the local storage device 120, prior to storage.

In some embodiments, the processing circuitry 114 may be configured to run a big data application (e.g., a Hadoop application) and to serve the processed data to the computer network 104 (e.g., through the MAC 2 126, illustrated in FIG. 2 and discussed below). The processing circuitry 114 may also be coupled to the local storage device control circuitry 116 so that the processing circuitry 114 can access the local storage device 120 (e.g., to use as a cache for the Hadoop data). In some embodiments, the security circuitry 112 may perform security operations (e.g., in accordance with a security policy) on the inputs and/or outputs of the big data application. This may be done in an in-line fashion without data copying, and may include privacy screening and deep packet inspection operations.

In some embodiments, the host computing device 108 (e.g., the CPU of the host computing device 108) may access the remote storage device 106. If the operating systems of the host computing device 108 and the processing circuitry 114 run the same implementation of the file system of the remote storage device 106, the host computing device 108 and the processing circuitry 114 may view the same data on the remote storage device 106. In some embodiments, the use of the remote storage device 106 as a shared hard drive may be constrained by requiring that the remote storage device 106 be mounted as read-only by the host computing device 108 to avoid data corruption. This may be sufficient for implementations in which the operations of the host computing device 108 are limited to data backup and other management tasks relative to the remote storage device 106. The host computing device 108 may itself have a storage device (e.g., a hard drive) that can contain an operating system for the host computing device 108 and a file system for the storage device that is not viewable by the network interface device 102. The host computing device 108 may boot from this storage device.

In some embodiments, the processing circuitry 114 may implement a network management policy (stored in storage accessible to the processing devices of the processing circuitry 114) that specifies what network traffic received by the receiver circuitry 110 should be directed for storage in the local storage device 120 and what network traffic received by the receiver circuitry 110 should be directed for storage in the remote storage device 106. The network management policy may take any desired form, and a number of examples of network management policies are discussed herein.

In some embodiments, the network management policy implemented by the processing circuitry 114 may provide unified software defined networking (SDN) policy and software defined storage (SDS) policy. This may enable the implementation of network functions virtualization (NFV), in which per-tenant security models are desired for networking and storage (so that multiple tenants share the same host, while the system protects them from each other). Each tenant may have its own settings for network addresses, packet tags (which ensure that only users with proper credentials can see network traffic), security settings, secure networking settings and keys, bandwidth allocation and selective layer encryption (SLE), and latency SLE. In some embodiments, when a tenant instantiation of a virtualized network function or virtual machine is migrated between remote storage devices managed by the host computing device 108, private keys for these instantiations may be stored with the data and moved automatically.

In some embodiments, the network management policy implemented by the processing circuitry 114 may provide a tiered data access system. Tenant computing devices that wish to have faster access to data may be allocated storage in the local storage device 120 (which may be, for example, an embedded solid state drive, and may be used to cache frequently used blocks or file systems) by the network management policy, while other tenant computing devices may principally rely on storage in the remote storage device 106.

In some embodiments, the remote storage system 100 may be used to enable a cleaner secure boot than achieved by conventional storage systems. In such embodiments, an encrypted and/or signed boot image may be downloaded into the remote storage device 106 via the network interface device 102 (e.g., over a secure channel, such as a secure shell (SSH) secure channel to a board management controller), and decrypted and verified for use by the processing circuitry 114. The local storage device 120 may be encrypted, and the encryption keys may not be exposed to the host computing device 108 (but only to the processing circuitry of the network interface device 102).

Figure 2:
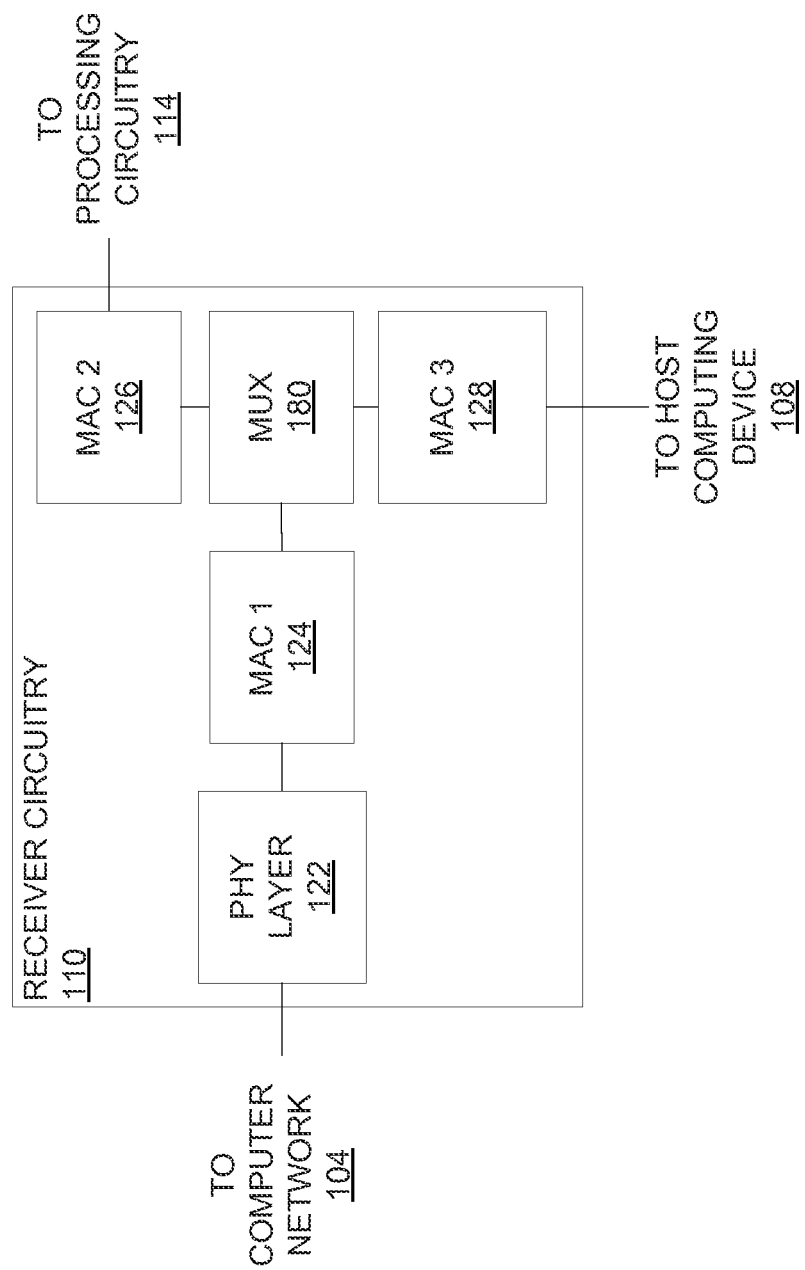
FIG. 2 is a block diagram of illustrative receiver circuitry that may be included in the network interface device of the remote storage system of FIG. 1, in accordance with various embodiments.

FIG. 2 is a block diagram of an embodiment of the receiver circuitry 110 that may be included in the network interface device 102. The receiver circuitry 110 may include a physical (PHY) layer 122 to receive data from the computer network 104. A Medium Access Control (MAC) 1 124 may receive the data from the PHY layer 122, and may be coupled to a MAC 2 126 and a MAC 3 128 via a multiplexer (MUX 180). The MUX 180 may be controlled (e.g., by dedicated circuitry) to route data packets to the MAC 2 126 or to the MAC 3 128 depending upon the destination address of the packets. The MAC 2 126 may provide data to the processing circuitry 114, and the MAC 3 128 may provide the data to the host computing device 108. In some embodiments, the MAC 1 124, the MAC 2 126, and/or the MAC 3 128 may be included in a single integrated circuit (e.g., as logical aspects of the integrated circuit).

Figure 3:
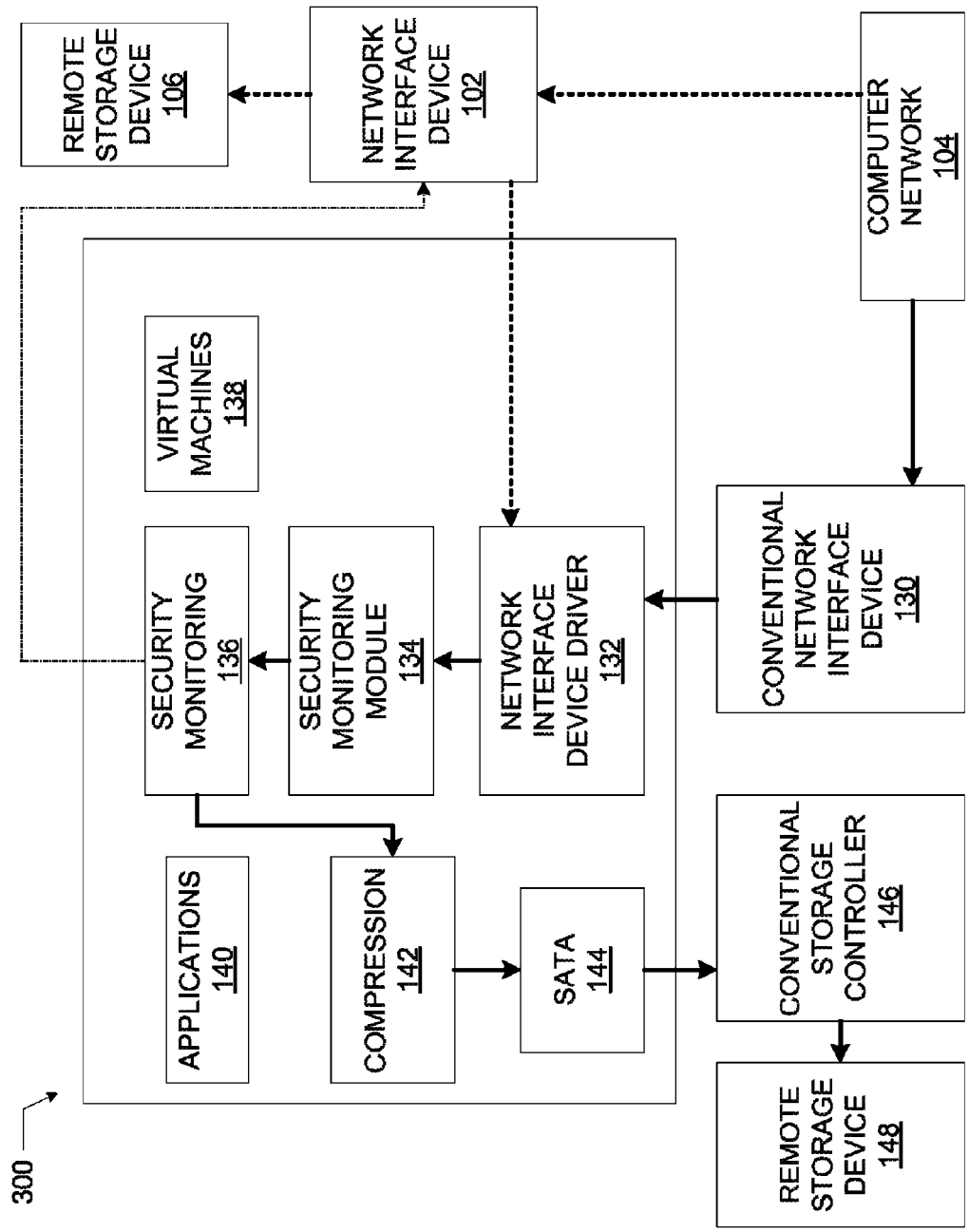
FIG. 3 is a block diagram of an illustrative monitoring system, in accordance with various embodiments.

FIG. 3 is a block diagram of an illustrative monitoring system 300, in accordance with various embodiments. The monitoring system 300 may include the remote storage system 100, and in particular, may include the network interface device 102. The monitoring system 300 is also illustrated as including conventional components (i.e., a conventional network interface device 130, a conventional storage controller 146, and a remote storage device 148 in communication with the conventional storage controller 146) so that the differences in operation between the remote storage system 100 and conventional storage systems may be highlighted. In some embodiments, the monitoring system 300 may not include the conventional components.

The monitoring system 300 may be configured to perform security monitoring. Security monitoring of network operations may be required by an auditing body, a service level agreement, or a regulatory entity, for example. In some such embodiments, network traffic received by a device must be stored to non-volatile storage (e.g., for later analysis). This network traffic may be identified per-flow, per-subscriber (e.g., by international mobile subscriber identifier (IMSI) by subscriber identity module identifier (SIM ID)), per-tenant, per quality of service, per billed entity, or any other criteria.

The monitoring system 300 includes an embodiment of the host computing device 108 having a number of components, including a network interface device driver 132, a security monitoring module 134, a security monitoring application 136, virtual machines 138, other applications 140, compression circuitry 142, and SATA circuitry 144. The security monitoring module 134 may be a hardware component configured to inspect data for patterns (e.g., virus signatures or attack packets), and the security monitoring application 136 may be software configured to respond to the patterns detected by the security monitoring module 134. The network interface device driver 132 may be a conventional driver, and may enable the host computing device 108 to interface with the network interface device 102 and the conventional network interface device 130.

The different line types in FIG. 3 illustrate different dataflow pathways in the monitoring system 300. The conventional pathway is given by the solid line. In particular, in conventional systems, data from the computer network 104 would be routed through the conventional network interface device 130 and into the host computing device 108 via the network interface device driver 132. The data will be routed through the security monitoring module 134 and through the security monitoring application 136 before being compressed by the compression circuitry 142 and sent through the SATA 144 for transmission via bus to the conventional storage controller 146. The conventional storage controller 146 would then direct the storage of the compressed data to the remote storage device 148.

In contrast, in some embodiments of the remote storage system 100, data from the computer network 104 is routed to the network interface device 102 and then stored directly in the remote storage device 106 by the network interface device 102, as indicated by the dotted line. In some embodiments, the network interface device 102 may be in communication with the host computing device 108 via the network interface device driver 132, but data to be stored in the remote storage device 106 need not be passed through the network interface device driver 132. The network interface device 102 may store data in the remote storage device 106 (and/or in local storage, such as the local storage device 120, not shown in FIG. 3) in accordance with the network management policy provided to the network interface device 102 by the security monitoring application 136 (as indicated by the dashed line).

For example, the network management policy may include a software defined network policy and a software defined storage policy, and the network interface device 102 may process the traffic to be monitored (based on the policies), including compressing the traffic using a compression engine on the network interface device 102 (e.g., included in the security circuitry 112 or the processing circuitry 114). The network interface device 102 may then transmit the traffic to the remote storage device 106 (e.g., a RAID) using the remote storage device control circuitry 118. The policies may be securely delivered to the network interface device 102 using a software defined network controller, a software defined storage controller, or a policy orchestrator (e.g., by delivering the policies to a platform policy agent running in an operating system or virtual machine manager of the host device 108, then to the network interface device 102 using drivers included in the host device 108).

Figure 4:
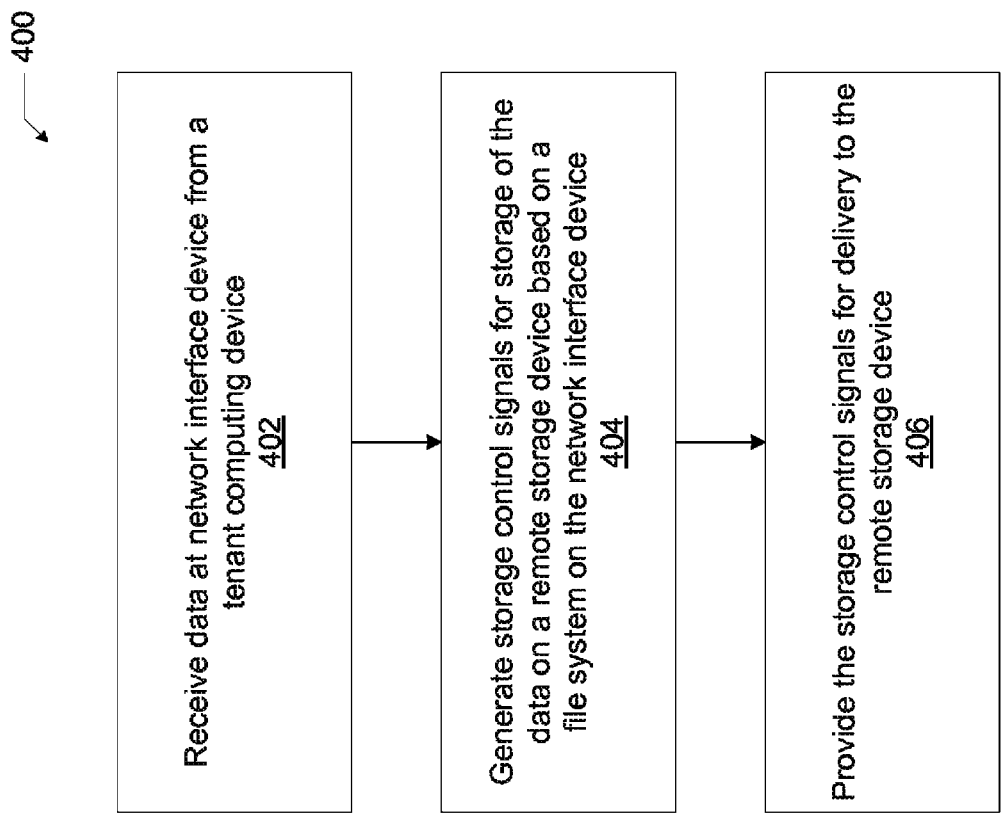
FIG. 4 is a flow diagram of a method of storing tenant data, in accordance with various embodiments.

FIG. 4 is a flow diagram of a method 400 of storing tenant data, in accordance with various embodiments. The operations of the method 400 (and the other methods described herein), although illustrated as performed in a particular sequence for the sake of illustration, may be performed in parallel as suitable or in any other order. For example, for different subsets of the data to be stored, operations related to generating storage control signals may be performed in parallel with operations related to providing the storage control signals.

Operations of the method 400 (and the other methods described herein) may be described as performed by the network interface device 102, for illustrative purposes, but the operations of the method 400 (and the other methods described herein) may be performed by any suitably configured circuitry. Any of the operations of the method 400 (and the other methods described herein) may be performed in accordance with any suitable ones of the embodiments of the network interface device 102 described herein.

At 402, the network interface device 102 (e.g., the receiver circuitry 110) may receive data from a tenant computing device (e.g., included in the computer network 104).

At 404, the network interface device 102 (e.g., the remote storage device controller circuitry 118) may generate storage control signals for storage of the data received at 402. The control signals may direct the remote storage device 106 (e.g., a hard disk drive) to store the data based on a file system included on the network interface device 102. The remote storage device 106 and the network interface device 102 may not share a physical support. In some embodiments, the file system is encrypted and is not understandable by the host computing device 108 coupled to the network interface device 102.

At 406, the network interface device 102 (e.g., the remote storage device controller circuitry 118) may provide the storage control signals for delivery to the remote storage device 106. The provision of 406 may take place over a bus, such as a PCIe bus.

Other operations may be performed as part of the method 400. For example, the network interface device 102 (e.g., the security circuitry 112) may perform a security operation on the received data prior to generating storage control signals at 404. The security operation may include, for example, a firewall operation, anti-virus detection, deep packet inspection, or malicious activity detection.

Figure 5:
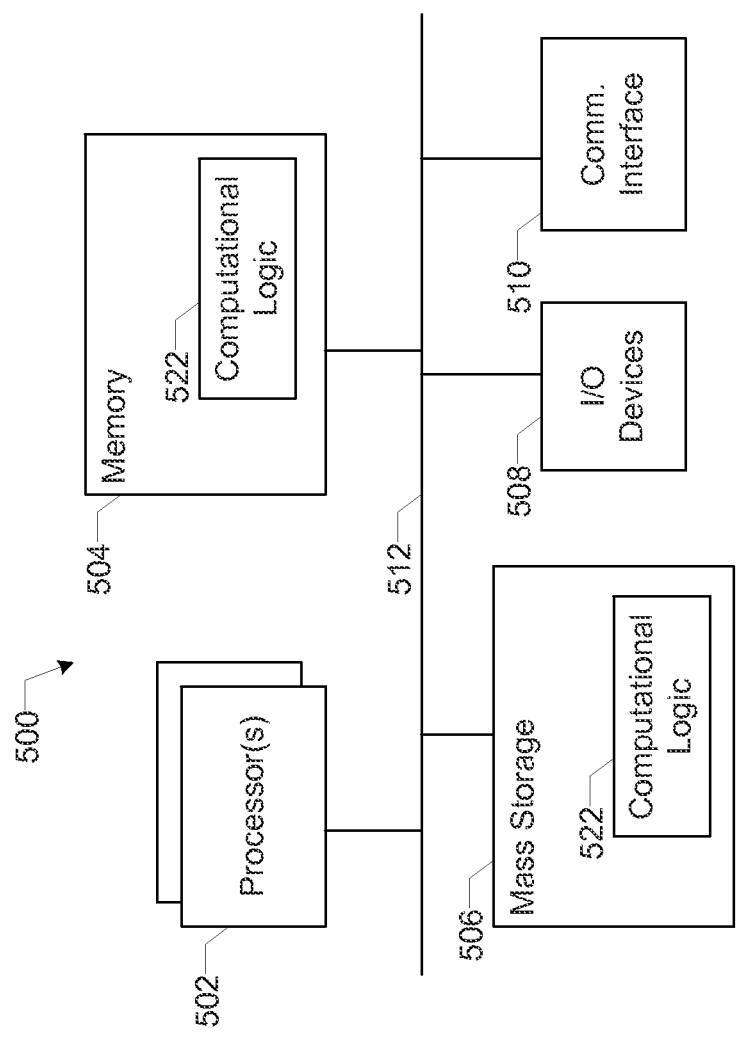
FIG. 5 is a block diagram of an example computing device suitable for practicing various ones of the disclosed embodiments.

FIG. 5 is a block diagram of an example computing device 500 suitable for practicing various aspects of the disclosed embodiments, in accordance with some embodiments. For example, the computing device 500 may serve as the host computing device 108 and/or one of the computing devices included in the computer network 104 (e.g., a tenant computing device).

As shown, the computing device 500 includes a number of processors or processor cores 502, and a system memory 504. For the purpose of this application, including the claims, the terms "processor" and "processor cores" may be considered synonymous, unless the context clearly requires otherwise. Additionally, the computing system 500 may include mass storage devices 506 (such as diskette, hard drive, compact disc read only memory (CD-ROM) and so forth), input/output devices 508 (such as display, keyboard, cursor control, and so forth), and communication interfaces 510 (such as network interface cards, modems, and so forth). The elements may be coupled to each other via system bus 512, which represents one or more buses (e.g., a PCIe bus). In the case of multiple buses, they may be bridged by one or more bus bridges (not shown).

Each of these elements may perform its conventional functions known in the art. In particular, the system memory 504 and the mass storage 506 may be employed to store a working copy and a permanent copy of the programming instructions implementing the method of FIG. 4, or portions thereof, herein collectively denoted as computational logic 522. The various components may be implemented by assembler instructions supported by processor(s) 502 or high-level languages, such as, for example, C, that can be compiled into such instructions.

The permanent copy of the programming instructions may be placed into permanent storage 506 in the factory, or in the field, through, for example, a machine-accessible distribution medium (not shown), such as a compact disc (CD), or through communication interface 510 (e.g., from a distribution server (not shown)). The constitution of elements 502-512 are known, and accordingly will not be further described.

Computer readable media (including non-transitory computer-readable media), methods, systems and devices for performing the above-described techniques are illustrative examples of embodiments disclosed herein. Additionally, other devices in the above-described interactions may be configured to perform various disclosed techniques.

The following paragraphs provide non-limiting examples of the embodiments disclosed herein. Example 1 is a network interface device, including: receiver circuitry; and first storage device control circuitry, coupled to the receiver circuitry and sharing a physical support with the receiver circuitry, to control writing of data from the receiver circuitry to a first storage device, and may further specify that the first storage device does not share a physical support with the first storage device control circuitry.

Example 2 may include the subject matter of Example 1, and may further include: security circuitry, coupled to the receiver circuitry and sharing a physical support with the receiver circuitry, to perform one or more security operations on data from the receiver circuitry to generate processed data; wherein the remote storage device control circuitry is to cause storage of the processed data on the first storage device.

Example 3 may include the subject matter of Example 2, and may further specify that the one or more security operations include an examination of data portions of incoming network packets.

Example 4 may include the subject matter of any of Examples 2-3, and may further specify that the one or more security operations include encryption.

Example 5 may include the subject matter of any of Examples 2-4, wherein the security circuitry includes a board management controller.

Example 6 may include the subject matter of any of Examples 1-5, and may further include: a second storage device, sharing a physical support with the receiver circuitry; and second storage device control circuitry, coupled to the receiver circuitry and sharing a physical support with the receiver circuitry, to control writing of data from the receiver circuitry to the second storage device.

Example 7 may include the subject matter of any of Examples 1-6, and may further include: a processing device, coupled to the receiver circuitry and sharing a physical support with the receiver circuitry; wherein: the receiver circuitry is to receive a network management policy, and the processing device is to direct storage, in the first storage device, of network traffic received by the receiver circuitry in accordance with the network management policy.

Example 8 may include the subject matter of Example 7, wherein the processing device is to direct compression of the network traffic prior to storage in the first storage device.

Example 9 may include the subject matter of any of Examples 1-8, wherein the network interface device is included in a network interface card, system-on-chip, or chipset.

Example 10 may include the subject matter of any of Examples 1-9, wherein the first storage device includes a hard disk drive or a solid state drive.

Example 11 may include the subject matter of any of Examples 1-10, wherein the first storage device control circuitry is coupled to the first storage device via a Peripheral Component Interconnect Express bus.

Example 12 may include the subject matter of any of Examples 1-11, wherein the physical support is a circuit board.

Example 13 is one or more computer readable media (e.g., non-transitory computer readable media) having instructions thereon that, in response to execution by one or more processing devices of a network interface device, cause the network interface device to: receive data from a computing network; perform one or more security operations on the data to generate processed data; and cause the processed data to be written to a first storage device that does not share a physical support with the network interface device using a file system on the network interface device.

Example 14 may include the subject matter of Example 13, wherein the first storage device includes a disk drive.

Example 15 may include the subject matter of any of Examples 13=14, wherein the file system is encrypted using an encryption key provided to the network interface device from a tenant computing device via a secure channel.

Example 16 may include the subject matter of any of Examples 13-15, wherein the network interface device is coupled to a host computing device via a bus, and wherein the network interface device appears as a local storage device to the host computing device.

Example 17 may include the subject matter of any of Examples 13-16, wherein the first storage device is coupled to a host computing device via a bus, and the file system is encrypted against the host computing device.

Example 18 may include the subject matter of any of Examples 13-17, further having instructions thereon that, in response to execution by the one or more processing devices of the network interface device, cause the network interface device to: receive second data from the computing network; determine that the second data is to be stored in a second storage device that shares a physical support with the network interface device; and cause the second data to be stored in the second storage device.

Example 19 may include the subject matter of any of Examples 13-18, wherein the network interface device is a network switch.

Example 20 may include the subject matter of any of Examples 13-19, wherein the first storage device includes a solid state drive.

Example 21 is a method of storing tenant data, comprising: receiving data from a tenant computing device at a network interface device; generating storage control signals for storage of the data on a first storage device, by first storage device control circuitry of the network interface device, based on a file system on the network interface device, wherein the first storage device does not share a physical support with the network interface device; and providing the storage control signals for delivery to the first storage device over a bus.

Example 22 may include the subject matter of Example 21, wherein the bus is a Peripheral Component Interconnect Express bus.

Example 23 may include the subject matter of any of Examples 21-22, wherein the file system is encrypted and is not understandable by a host computing device coupled to the network interface device.

Example 24 may include the subject matter of any of Examples 21-23, and may further include: performing a security operation on the received data prior to generating storage control signals, wherein the security operation includes a firewall operation, anti-virus detection, or malicious activity detection.

Example 25 may include the subject matter of any of Examples 21-24, wherein the first storage device includes a solid state drive.

Example 26 is one or more computer readable media (e.g., non-transitory computer readable media) having instructions thereon that, in response to execution by one or more processing devices of a computing device, cause the computing device to perform the method of any of Examples 21-25, or any of the methods disclosed herein.

Example 27 is a system including means for performing the method of any of Examples 21-25, or any of the methods disclosed herein.

Example 28 is a network interface device including means for means for receiving data from a computer network; and means for controlling writing of data from the means for receiving data to a first storage device; wherein the first storage device does not share a physical support with the means for controlling writing of data, and the means for receiving data shares a physical support with the means for controlling writing of data.

Example 29 may include the subject matter of Example 28 and may further include means for performing one or more security operations on data from the means for receiving data to generate processed data; wherein the means for controlling writing of data is to cause storage of the processed data on the first storage device, and the means for performing one or more security operations shares a physical support with the means for receiving data.

Example 30 may include the subject matter of any of Examples 28-29, and may further include a second storage device, sharing a physical support with the means for receiving data; and means for controlling writing of data from the means for receiving data to the second storage device.

What is claimed is:

1. A network interface device, comprising:
receiver circuitry to receive data from a computer network;
security circuitry, coupled to and sharing a physical support with the receiver circuitry, to perform encryption on data received by the receiver circuitry from the computer network to generate processed data for a first storage device that cannot be read by a host computing device to which the receiver circuitry is coupled, and;
first storage device control circuitry, coupled to and sharing the physical support with the receiver circuitry and the security circuitry, the first storage device control circuitry to control writing of data from the receiver circuitry to the first storage device and to cause storage of the processed data on the first storage device, wherein the first storage device does not share a physical support with the first storage device control circuitry;
wherein the physical support is a common die, a circuit board, or a package.

2. The network interface device of claim 1, wherein the security circuitry is further to perform examination of data portions of incoming network packets.

3. The network interface device of claim 1, wherein the security circuitry includes a board management controller.

4. The network interface device of claim 1, further comprising:
a second storage device, sharing the physical support with the receiver circuitry; and
second storage device control circuitry, coupled to the receiver circuitry and sharing the physical support with the receiver circuitry, to control writing of data from the receiver circuitry to the second storage device.

5. The network interface device of claim 1, further comprising:
a processing device, coupled to the receiver circuitry and sharing the physical support with the receiver circuitry; wherein:
the receiver circuitry is to receive a network management policy, and
the processing device is to direct storage, in the first storage device, of network traffic received by the receiver circuitry in accordance with the network management policy.

6. The network interface device of claim 5, wherein the processing device is to direct compression of the network traffic prior to storage in the first storage device.

7. The network interface device of claim 1, wherein the network interface device is included in a network interface card, system-on-chip, or chipset.

8. The network interface device of claim 1, wherein the first storage device includes a hard disk drive or a solid state drive.

9. The network interface device of claim 1, wherein the first storage device control circuitry is coupled to the first storage device via a Peripheral Component Interconnect Express bus.

10. The network interface device of claim 1, wherein the physical support is a circuit board.

11. One or more non-transitory computer readable media having instructions thereon that, in response to execution by one or more processing devices of a network interface device, cause the network interface device to:
receive data from a computing network;
perform one or more security operations on the data to generate processed data; and
cause the processed data to be written to a first storage device that does not share a physical support with the network interface device using a file system on the network interface device;
wherein the first storage device is coupled to a host computing device via a bus, and the file system is encrypted against the host computing device;
wherein the physical support is a common die, a circuit board, or a package.

12. The one or more non-transitory computer readable media of claim 11, wherein the first storage device includes a disk drive.

13. The one or more non-transitory computer readable media of claim 11, wherein the file system is encrypted using an encryption key provided to the network interface device from a tenant computing device via a secure channel.

14. The one or more non-transitory computer readable media of claim 11, wherein the network interface device is coupled to a host computing device via a bus, and wherein the network interface device appears as a local storage device to the host computing device.

15. The one or more non-transitory computer readable media of claim 11, further having instructions thereon that, in response to execution by the one or more processing devices of the network interface device, cause the network interface device to:
receive second data from the computing network;
determine that the second data is to be stored in a second storage device that shares the physical support with the network interface device; and
cause the second data to be stored in the second storage device.

16. The one or more non-transitory computer readable media of claim 11, wherein the network interface device is a network switch.

17. The one or more non-transitory computer readable media of claim 11, wherein the first storage device includes a solid state drive.

18. A method of storing tenant data, comprising:
receiving data from a tenant computing device via a computer network at a network interface device;
generating storage control signals for storage of the data on a first storage device, by first storage device control circuitry of the network interface device, based on a file system on the network interface device, wherein the first storage device does not share a physical support with the network interface device; and providing the storage control signals for delivery to the first storage device over a bus;

wherein the file system is encrypted and is not decryptable by a host computing device of the network interface device;

wherein the physical support is a common die, a circuit board, or a package.

19. The method of claim 18, wherein the bus is a Peripheral Component Interconnect Express bus.

20. The method of claim 18, further comprising:
performing a security operation on the received data prior to generating storage control signals, wherein the security operation includes a firewall operation, anti-virus detection, or malicious activity detection.

21. The method of claim 18, wherein the first storage device includes a solid state drive.

22. An apparatus, comprising:
means for receiving data from a computer network;
means for performing an encryption operation on the data from the means for receiving data to generate processed data that is encrypted and not decryptable by a host device of the network interface device; and
means for controlling writing of the processed data to a first storage device;
wherein the first storage device does not share a physical support with the means for controlling writing of data, and the means for receiving data shares a physical support with the means for controlling writing of data;
wherein the physical support is a common die, a circuit board, or a package.

23. The apparatus of claim 22, further comprising:
means for performing one or more additional security operations on the data from the means for receiving data to generate the processed data;
wherein the means for controlling writing of data is to cause storage of the processed data on the first storage device, and the means for performing one or more security operations shares the physical support with the means for receiving data.

24. The apparatus of claim 22, further comprising:
a second storage device, sharing the physical support with the means for receiving data; and
means for controlling writing of data from the means for receiving data to the second storage device.

25. The apparatus of claim 22, wherein the apparatus is a network interface device.

* * * * *